US012757086B2

(12) United States Patent
Chen et al.

(10) Patent No.: US 12,757,086 B2
(45) Date of Patent: Oct. 6, 2026

(54) NETWORK SWITCHING METHOD AND TERMINAL

(71) Applicant: VIVO MOBILE COMMUNICATION CO.,LTD., Guangdong (CN)

(72) Inventors: Li Chen, Guangdong (CN); Xueming Pan, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 813 days.

(21) Appl. No.: 17/578,925

(22) Filed: Jan. 19, 2022

(65) Prior Publication Data

US 2022/0141745 A1 May 5, 2022

Related U.S. Application Data

(63) Continuation of application No. PCT/CN2020/106173, filed on Jul. 31, 2020.

(30) Foreign Application Priority Data

Jul. 31, 2019 (CN) ......................... 201910704620.6

(51) Int. Cl.
*H04W 36/36* (2009.01)
*H04W 36/00* (2009.01)

(52) U.S. Cl.
CPC ........ *H04W 36/03* (2018.08); *H04W 36/0011* (2013.01); *H04W 36/36* (2013.01)

(58) Field of Classification Search
CPC . H04W 36/03; H04W 76/23; H04W 36/0011; H04W 36/36; H04B 1/401
See application file for complete search history.

(56) References Cited

U.S. PATENT DOCUMENTS

| | | | | |
|---|---|---|---|---|
| 8,213,360 B2 * | 7/2012 | Koskela | H04W 36/304 | 370/328 |
| 2012/0218973 A1 | 8/2012 | Du et al. | | |
| 2014/0071950 A1 * | 3/2014 | Jang | H04W 76/14 | 370/331 |
| 2015/0282232 A1 * | 10/2015 | Yamazaki | H04W 76/23 | 370/329 |

(Continued)

FOREIGN PATENT DOCUMENTS

| | | |
|---|---|---|
| CN | 101031146 A | 9/2007 |
| CN | 103686911 A | 3/2014 |

(Continued)

OTHER PUBLICATIONS

The First Office Action of Priority Application No. CN 201910704620.6 issued by the Chinese Patent Office on Mar. 3, 2021.

(Continued)

*Primary Examiner* — Jeanette J Parker
*Assistant Examiner* — Dung L Lam
(74) *Attorney, Agent, or Firm* — IP & T GROUP LLP

(57) ABSTRACT

A network switching method includes: in a case that a first terminal is in a state of a first network connection mode and a first preset triggering condition is detected, switching from the first network connection mode to a second network connection mode.

15 Claims, 2 Drawing Sheets

(56) References Cited

U.S. PATENT DOCUMENTS

| | | | | |
|---|---|---|---|---|
| 2016/0135246 | A1* | 5/2016 | Li | H04W 76/14 370/329 |
| 2016/0374139 | A1* | 12/2016 | Chen | H04W 76/23 |
| 2018/0098249 | A1 | 4/2018 | Lee et al. | |
| 2018/0124674 | A1 | 5/2018 | Vutukuri et al. | |
| 2018/0359671 | A1 | 12/2018 | Xu et al. | |

FOREIGN PATENT DOCUMENTS

| | | | |
|---|---|---|---|
| CN | 105472676 | A | 4/2016 |
| CN | 105898814 | A | 8/2016 |
| CN | 106714256 | A | 5/2017 |
| CN | 107690163 | A | 2/2018 |
| CN | 107889080 | A | 4/2018 |
| CN | 108419279 | A | 8/2018 |
| EP | 3307011 | A1 | 4/2018 |
| EP | 3474602 | A1 | 4/2019 |
| WO | 2014062714 | A1 | 4/2014 |
| WO | 2018/058514 | A1 | 4/2018 |
| WO | 2019/127260 | A1 | 7/2019 |

OTHER PUBLICATIONS

The Second Office Action of Priority Application No. CN 201910704620.6 issued by the Chinese Patent Office on Aug. 24, 2021.

International Search Report and Written Opinion of Priority Application No. PCT/CN2020/106173 issued by the Chinese Patent Office on Oct. 14, 2020.

Extended European Search Report for European Patent Application 20845902.4 issued by the European Patent Office on Jul. 13, 2022.

* cited by examiner

NETWORK SWITCHING METHOD AND TERMINAL

CROSS-REFERENCE TO RELATED APPLICATIONS

This application is a Bypass Continuation Application of PCT/CN2020/106173 filed on Jul. 31, 2020, which claims priority to Chinese Patent Application No. 201910704620.6 filed on Jul. 31, 2019, which are incorporated herein by reference in their entirety.

TECHNICAL FIELD

The present disclosure relates to the technical field of communication, and in particular, to a network switching method and a terminal.

BACKGROUND

The networking methods for wearable devices (such as watches, glasses, earphones, bracelets, and other handheld terminals, etc.) include:

Method I: connection with cellular network-connected terminals (such as mobile phones, desktops, notebooks, handheld computers, etc.) through a non-cellular network.

Method II: direct connection with the cellular network.

SUMMARY

According to a first aspect, embodiments of the present disclosure provide a network switching method. The network switching method includes:

in a case that the first terminal is in a state of a first network connection mode and a first preset triggering condition is detected, switching from the first network connection mode to a second network connection mode, wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network.

According to a second aspect, embodiments of the present disclosure further provide a terminal. The terminal is a first terminal and includes:

a network switching module, configured to, in a case that the first terminal is in a state of a first network connection mode and a first preset triggering condition is detected, switch from the first network connection mode to a second network connection mode, wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network.

According to a third aspect, embodiments of the present disclosure further provide a terminal, including: a memory, a processor, and a computer program stored in the memory and executable on the processor, wherein when the computer program is executed by the processor, the steps of the above network switching method are implemented.

According to a fourth aspect, embodiments of the present disclosure further provide a non-transitory computer readable storage medium, wherein the non-transitory computer readable storage medium stores a computer program; and when the computer program is executed by a processor, the steps of the above network switching method are implemented.

DESCRIPTION OF EMBODIMENTS

Figure 1:
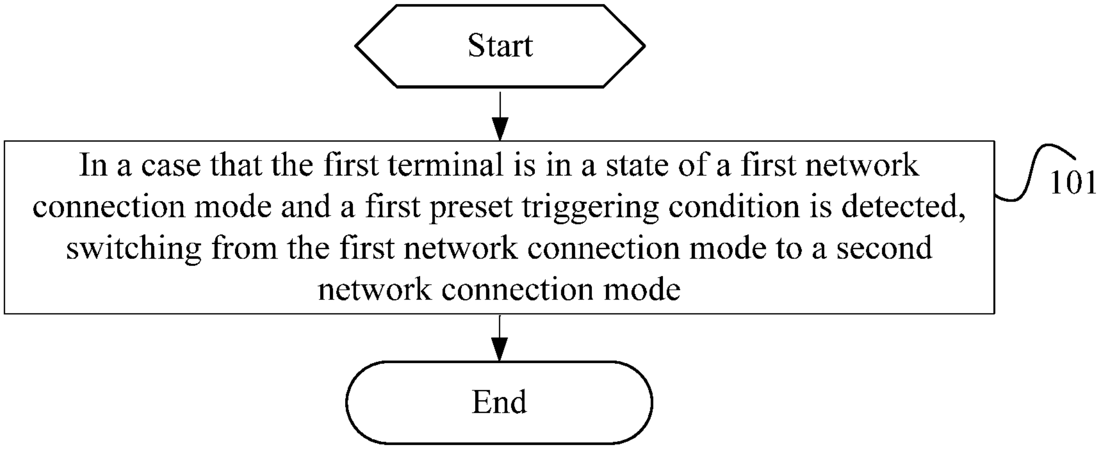
FIG. 1 shows a schematic flowchart of a network switching method according to an embodiment of the present disclosure.

To make the objectives, technical solutions and advantages of the present disclosure clearer, the following describes the present disclosure with reference to the accompanying drawings and embodiments.

The term "and/or" in this specification describes only an association relationship for describing associated objects and represents that three relationships may exist. For example, A and/or B may represent the following three cases: only A exists, both A and B exist, and only B exists.

In the description of the embodiments of the present disclosure, some concepts used in the following description are explained first.

The first terminal or the second terminal is connected with the cellular network, and the first terminal or the second terminal is connected to the cellular network. The cellular network includes second generation (2G) mobile communication network, third generation (3G) mobile communication network, fourth generation (4G) mobile communication network, fifth generation (5G) mobile communication network, and further-evolved cellular communication systems.

The non-cellular network includes, such as Bluetooth (BT), WiFi, Sidelink (near field communication), device to device (D2D), vehicle-vehicle/vehicle-road/vehicle-to-vehicle communication (V2X/V2V/V2I).

The first terminal may be a wearable device (such as a watch, earphones, glasses, bracelet, etc.), and the second terminal may be other terminal devices (such as a mobile phone, a personal computer, a laptop, a handheld computer, etc.); or the second terminal may be a wearable device (such as a watch, earphones, glasses, a bracelet, etc.), and the first terminal may be other terminal devices (such as a mobile phone, a personal computer, a laptop, a handheld computer, etc.).

When the first terminal is a wearable device and the second terminal is other terminal devices, or the second terminal is a wearable device and the first terminal is other terminal devices, the relationship between the wearable device and other terminal devices may be that use different subscriber identity modules with the same number; use different terminals with the same number; wearable devices use universal subscriber identity modules, and other terminal devices use embedded subscriber identity modules; use different numbers; and use two numbers that have a binding relationship.

When the first terminal and the second terminal are directly connected through the non-cellular network, the second terminal communicates with a network side device through the cellular network, and the first terminal communicates with the network side device indirectly through the second terminal; and when the terminal is directly connected to the cellular network of the network side device, the first terminal directly communicates with the network side device through the cellular network.

At present, after the non-cellular network connection between the wearable device and the terminal is disconnected, a user can operate on a user interface (UI) to connect the wearable device to the cellular network. The user operation takes a long time, which may cause service interruption.

Aiming at the problem that the switching between the non-cellular network connection and the cellular network connection is likely to cause service interruption, the present disclosure provides a network switching method and a terminal.

As shown in FIG. 1, an embodiment of the present disclosure provides a network switching method, applied to a terminal. The terminal is a first terminal, and the network switching method includes:

step 101: in a case that the first terminal is in a state of a first network connection mode and a first preset triggering condition is detected, switching from the first network connection mode to a second network connection mode, wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network.

It should be noted that the terminal is connected to the cellular network, that is, the terminal and a base station are connected through the cellular network. Therefore, the first terminal is connected to the cellular network, that is, the first terminal is connected to a first base station through the cellular network; and the second terminal is connected to the cellular network, that is, the second terminal is connected to a second base station through the cellular network.

That is, the embodiments of the present disclosure include: switching from a mode that the first terminal is directly connected to the first base station through a network to a mode that the first terminal is connected to the second base station through a network and through the second terminal; and switching a mode that the first terminal is connected to the second base station through a network and through the second terminal to a mode that the first terminal is directly connected to the first base station through a network.

In addition, the first base station and the second base station may be the same base station, or may be different base stations, or different cells under the same base station.

It should be noted that the first preset triggering condition is automatically detected when the first terminal is in the first network connection mode, and the first network connection mode is automatically switched to the second network connection mode when the first preset triggering condition is detected. Therefore, the triggering condition of the network switch is automatically detected when the first network connection mode of the first terminal is not disconnected, so that the fact that a network connection in other modes is established after a network connection is interrupted is avoided, and the probability of service interruption is reduced.

The network switching method provided by the embodiment of the present disclosure is suitable for switching part or all of the services of the first terminal under the cellular network connection to the non-cellular network direct connection with the second terminal, which is realized through the cellular network connection between the second terminal and the second base station. Or the method is suitable for switching part of all of the services of the first terminal through the non-cellular network direction connection with the second terminal and under the cellular network connection between the second terminal and the second base station to a connection between the first terminal and the cellular network.

Optionally, in a case that the first network connection mode is that the first terminal is connected to the cellular network, the first preset triggering condition includes at least one of:

a non-cellular network connection being established between the first terminal and the second terminal;

preset indication information being generated by an upper layer of the first terminal or the second terminal, where the preset indication information is used to indicate to switch to the second network connection mode;

the signal quality of the non-cellular network being higher than or equal to a first preset threshold;

a distance between the first terminal and the second terminal being less than or equal to a second preset threshold; or a first service of the first terminal being interrupted.

That is, in a case that the first network connection mode is a cellular network connection between the first terminal and the first base station, and the second network connection mode is a non-cellular network connection between the first terminal and the second terminal and the second terminal is connected to the second base station through the cellular network, the first preset triggering condition is used to trigger the switching from the cellular network direct connection between the first terminal and the first base station to the connection between the first terminal and the second base station through the second terminal.

For the above first item "a non-cellular network connection is established between the first terminal and the second terminal", it may be that the first terminal is automatically connect to the second terminal through a non-cellular technology, or may be that the second terminal is automatically connected to the first terminal through the non-cellular technology; and it may be that a user operates the first terminal to perform non-cellular network connection on the first terminal and the second terminal, or may be that a user operates the second terminal to perform non-cellular network connection on the second terminal and the first terminal.

For the above second item, the "upper layer" may be, for example, an application layer or a service layer above the RRC layer.

For the above third item, "the quality of the non-cellular network signal" may be detected by the first terminal, or may be detected by the second terminal.

For the above fourth item, the "distance between the first terminal and the second terminal" may be detected by the first terminal, or may be detected by the second terminal.

For the above fifth item, the first service is at least part of the services of the first terminal. For example, it may trigger the switching from the first network connection mode to the second network connection mode only for a situation where one service is disconnected but other services are kept connected.

Optionally, in a case that the first network connection mode is that the first terminal is connected to the second terminal through the non-cellular network and the second terminal is connected to the cellular network, the first preset triggering condition includes at least one of:

a non-cellular network connection between the first terminal and the second terminal being disconnected;

preset indication information being generated by an upper layer of the first terminal or the second terminal, where the preset indication information is used to indicate to switch to the second network connection mode;

the signal quality of the non-cellular network being lower than or equal to a first preset threshold;

a distance between the first terminal and the second terminal being greater than or equal to a second preset threshold; or a first service of the first terminal being interrupted.

That is, in a case that the second network connection mode is a cellular network connection between the first terminal and the first base station and the first network connection mode is that the first terminal is connected to the second terminal through the non-cellular network and the second terminal is connected to the second base station through the cellular network, the first preset triggering condition is used to trigger the switching from the connection between the first terminal and the second base station through the second terminal to the cellular network direction connection between the first terminal and the first base station.

For the above first item "the non-cellular network connection between the first terminal and the second terminal is disconnected", it may be that the first terminal automatically disconnects the non-cellular network connection with the second terminal, or may be that the second terminal automatically disconnects the non-cellular network connection with the first terminal; and it may be that a user operates the first terminal to disconnect the non-cellular network connection with the second terminal, or may be that a user operates the second terminal to disconnect the non-cellular network connection with the first terminal.

For the above second item, the "upper layer" may be, for example, an application layer.

For the above third item, "the quality of the non-cellular network signal" may be detected by the first terminal, or may be detected by the second terminal.

For the above fourth item, "the distance between the first terminal and the second terminal" may be detected by the first terminal, or may be detected by the second terminal.

For the above fifth item, the first service is at least part of the services of the first terminal. For example, it may trigger the switch from the first network connection mode to the second network connection mode only for a situation where one service is disconnected but other services are kept connected.

Optionally, before the step of switching from the first network connection mode to the second network connection mode, the method further includes:

transmitting first auxiliary information for switching from the first network connection mode to the second network connection mode to the second terminal.

That is, in order to quickly realize the switching between the two connection modes, such as the cellular network direct connection between the first terminal and the first base station and the connection between the first terminal and the second base station through the second terminal, the first terminal may transmit some auxiliary information to the second terminal.

Optionally, in a case that the first network connection mode is that the first terminal is connected to the cellular network, the first auxiliary information includes at least one of:

identification information of the first terminal, optionally including International mobile subscriber identity (IMSI), 5G S-temporary mobile subscription identifier (5G-S-TMSI), cell radio network temporary identifier (Cell RNTI) and user equipment identifier (UE_ID);

identification information of a subscriber identity module (SIM) corresponding to the first terminal, or identification information of an embedded subscriber identity module (eSIM) corresponding to the first terminal, or identification information of a universal subscriber identity module (USIM) corresponding to the first terminal;

a frequency point at which the first terminal accesses the cellular network;

a radio access technology (RAT) for the first terminal to access the cellular network;

a cell identifier for the first terminal to access the cellular network;

a public land mobile network identifier (PLMN ID) for the first terminal to access the cellular network;

a reference signal measurement value (that is, a reference signal measurement value corresponding to the cellular network of the first base station measured by the first terminal) corresponding to the cellular network measured by the first terminal, or measurement related configuration, wherein the measurement related configuration, for example, includes a measurement reference signal, a measurement object and a measurement configuration; at least part of capability information of the first terminal, optionally including access stratum (AS) capability and non-access stratum (NAS) capability, wherein the AS capability, for example, includes the number of receiving and transmitting antennae or the number of multiple input multiple output (MIMO) layers, the size of a layer 2 buffer (L2 buffer) and support power, and the NAS capability, for example, includes registered PLMN (RPLMN) and the capability to support a core network;

related configuration information configured by the first base station for the first terminal to monitor a physical downlink control channel (PDCCH);

at least part of random access channel (RACH) configuration for the first terminal to access the cellular network (that is, at least part of RACH configuration for the first terminal to access the first base station);

at least part of system messages of a cell which the first terminal is currently connected to;

at least part of radio resource control (RRC) configuration information of the first terminal corresponding to the cellular network of the first base station, optionally including a measurement object, a measurement configuration and an RRC connection configuration;

hybrid automatic retransmission request (HARQ) process related information of the first terminal in a connection state, optionally including an HARQ process number and an HARQ configuration;

a counter or timer related to an RRC layer of the first terminal;

a counter or timer related to a radio link control (RLC) layer of the first terminal;

a counter or timer related to a packet data convergence protocol (PDCP) layer of the first terminal;

a counter or timer related to a service data adaption protocol (SADP) layer of the first terminal;

a counter or timer related to a media access control (MAC) layer of the first terminal, optionally including a counter or timer in the discontinuous reception (DRX), RLM or BFR process;

discontinuous reception (DRX) configuration information of the first terminal, optionally including a period and an inactivity timer length;

PDCP configuration information of the first terminal, optionally including a sequence number (SN);

Internet protocol (IP) layer configuration information of the first terminal, optionally including an IP layer identifier and an IP address; or geographic location information of the first terminal, optionally including global position system (GPS) positioning.

That is, in order to quickly realize the switching from the cellular network direct connection between the first terminal and the first base station to the connection between the first terminal and the second base station through the second terminal, the first terminal may transmit at least one of the above information to the second terminal.

Optionally, in a case that the first network connection mode is that the first terminal is connected to the second terminal through the non-cellular network and the second terminal is connected to the cellular network, the first auxiliary information includes at least one of:

identification information of the first terminal, optionally including IMSI, 5G-S-TMSI, C-RNTI and UE_ID;

identification information of an SIM corresponding to the first terminal, or identification information of a USIM corresponding to the first terminal, or identification information of an eSIM corresponding to the first terminal;

a reference signal measurement value (that is, a reference signal measured value corresponding to the cellular network of the second base station measured by the first terminal) or measurement related configuration, wherein the measurement related configuration, for example, includes a measurement reference signal, a measurement object and a measurement configuration;

at least part of capability information of the first terminal, optionally including AS capability and NAS capability, wherein the AS capability, for example, includes the number of the MIMO layers, the size of buffer and support power, and the NAS capability, for example, includes RPLMN and the capability to support the core network;

at least part of system messages of a network side (that is, the second base station);

Internet protocol layer configuration information of the first terminal;

configuration information which the first terminal needs to request from the network side; or geographic location information of the first terminal, optionally including GPS positioning.

That is, in order to quickly realize the switching from the connection between the first terminal and the second base station through the second terminal to the cellular network direct connection between the first terminal and the first base station, the first terminal may transmit at least one of the above information to the second terminal.

Optionally, in a case that the first network connection mode is that the first terminal is connected to the cellular network, the step of transmitting the first auxiliary information for switching from the first network connection mode to the second network connection mode to the second terminal includes one of:

configuring the first auxiliary information for the second terminal through the network side (that is, the first base station);

forwarding the first auxiliary information to the second terminal through the network side (that is, the first base station); or establishing a non-cellular network connection between the first terminal and the second terminal, and transmitting the first auxiliary information to the second terminal through the non-cellular network connection between the first terminal and the second terminal.

That is, in a case that the cellular network direct connection between the first terminal and the first base station is switched to the connection between the first terminal and the second base station through the second terminal, the first terminal may transmit the first auxiliary information to the second terminal through any one of the above modes.

The above third mode is as follows: firstly, establishing the non-cellular network connection between the first terminal and the second terminal so as to transmit the first auxiliary information to the second terminal through the non-cellular network connection between the first terminal and the second terminal.

In addition, the first auxiliary information is used to switch from the first network connection mode to the second network connection mode. Then in a case that the first network connection mode is a cellular network connection between the first terminal and the first base station, and the second network connection mode is that the first terminal is connected to the second terminal through the non-cellular network and the second terminal is connected to the second base station through the cellular network, due to the non-cellular network connection between the first terminal and the second terminal which has been established when the first auxiliary information is transmitted, after the second terminal receives the first auxiliary information and when the network connection mode is switched, it is only necessary to disconnect the cellular network connection between the first terminal and the first base station and establish the cellular network connection between the second terminal and the second base station.

Optionally, in a case that the first network connection mode is that the first terminal is connected to the second terminal through the non-cellular network and the second terminal is connected to the cellular network, the step of transmitting the first auxiliary information for switching from the first network connection mode to the second network connection mode to the second terminal includes one of:

transmitting the first auxiliary information to the second terminal through the non-cellular network between the first terminal and the second terminal;

configuring the first auxiliary information for the second terminal through the network side (that is, the second base station); or forwarding the first auxiliary information to the second terminal through the network side (that is, the second base station).

That is, in a case that the connection between the first terminal and the second base station through the second terminal to the cellular network direct connection between the first terminal and the first base station, the first terminal may transmit the first auxiliary information to the second terminal through any one of the above modes.

Optionally, before the step of switching from the first network connection mode to the second network connection mode, the method further includes:

receiving second auxiliary information transmitted by the second terminal for switching from the first network connection mode to the second network connection mode.

That is, in order to quickly realize the switching between the two connection modes, such as the cellular network direct connection between the first terminal and the first base station and the connection between the first terminal and the second base station through the second terminal, the second terminal may also transmit some auxiliary information to the first terminal.

Optionally, in a case that the first network connection mode is that the first terminal is connected to the cellular network, the second auxiliary information includes at least one of:

identification information of the second terminal, optionally including IMSI, 5G-S-TMSI, C-RNTI and UE_ID;

identification information of an SIM corresponding to the second terminal, or identification information of a USIM corresponding to the first terminal, or identification information of an eSIM corresponding to the first terminal;

at least part of capability information of the second terminal, optionally including AS capability and NAS capability, wherein the AS capability, for example, includes the number of the MIMO layers, the size of buffer and support power, and the NAS capability, for example, includes RPLMN and the capability to support the core network;

IP layer configuration information of the second terminal; or geographic location information of the second terminal, optionally including GPS positioning.

That is, in order to rapidly realize the switching from the cellular network direct connection between the first terminal and the first base station to the connection between the first terminal and the second base station through the second terminal, the second terminal may transmit at least one of the above information to the first terminal.

Optionally, in a case that the first network connection mode is that the first terminal is connected to the second terminal through the non-cellular network and the second terminal is connected to the cellular network, the second auxiliary information includes at least one of:

identification information of the second terminal, optionally including IMSI, 5G-S-TMSI, C-RNTI and UE_ID;

identification information of an SIM corresponding to the second terminal, or identification information of a USIM corresponding to the first terminal, or identification information of an eSIM corresponding to the first terminal;

a frequency point at which the second terminal accesses the cellular network;

an RAT for the second terminal to access the cellular network;

a cell identifier for the second terminal to access the cellular network;

a PLMN ID for the second terminal to access the cellular network;

a reference signal measurement value (that is, a reference signal measurement value corresponding to the cellular network of the second base station measured by the second terminal) corresponding to the cellular network measured by the second terminal, or measurement related configuration, wherein the measurement related configuration, for example, includes a measurement reference signal, a measurement object and a measurement configuration;

at least part of capability information of the second terminal, optionally including AS capability and NAS capability, wherein the AS capability, for example, includes the number of MIMO layers, the size of the buffer and support power, and the NAS capability, for example, includes RPLMN and the capability to support a core network;

related configuration information configured by the second base station for the second terminal to monitor PDCCH;

at least part of RACH configuration for the second terminal to access the cellular network (that is, at least part of RACH configuration for the second terminal to access second base station);

at least part of system messages of a cell which the second terminal is currently connected to;

at least part of RRC configuration information of the second terminal corresponding to the cellular network of the second base station, optionally including a measurement object, a measurement configuration and an RRC connection configuration;

hybrid automatic retransmission request (HARQ) process related information of the second terminal in a connection state, optionally including an HARQ process number and an HARQ configuration;

a counter or timer related to an RRC layer of the second terminal;

a counter or timer related to a radio link control (RLC) layer of the second terminal;

a counter or timer related to a packet data convergence protocol (PDCP) layer of the second terminal;

a counter or timer related to a service data adaption protocol (SADP) layer of the second terminal;

a counter or timer related to a media access control (MAC) layer of the second terminal, optionally including a counter or timer in the discontinuous reception (DRX), RLM or BFR process;

DRX configuration information of the second terminal, optionally including a period and an inactivity timer length;

PDCP configuration information of the second terminal, optionally including SN;

IP layer configuration information of the second terminal, optionally including an IP layer identifier and an IP address; or geographic location information of the first terminal, optionally including GPS positioning.

That is, in order to rapidly realize the switching from the connection between the first terminal and the second base station through the second terminal to the cellular network direction connection between the first terminal and the first base station, the second terminal may transmit at least one of the above information to the first terminal.

Optionally, in a case that the first network connection mode is that the first terminal is connected to the cellular network, the step of receiving the second auxiliary information for switching from the first network connection mode to the second network connection mode to the second terminal includes one of:

receiving the second auxiliary information configured by the network side (that is, the first base station) for the first terminal;

receiving the second auxiliary information forwarded by the network side (that is, the first base station) for the second terminal; or establishing a non-cellular network connection between the first terminal and the second terminal, and receiving the second auxiliary information transmitted by the second terminal through the non-cellular network connection between the first terminal and the second terminal.

That is, in a case that the cellular network direct connection between the first terminal and the first base station is switched to the connection between the first terminal and the second base station through the second terminal, the second terminal may transmit the second auxiliary information to the first terminal through any one of the above modes.

The above third mode is as follows: firstly, establishing the non-cellular network connection between the second terminal and the first terminal so as to transmit the second auxiliary information to the first terminal through the non-cellular network connection between the second terminal and the first terminal.

In addition, the second auxiliary information is used to switch from the first network connection mode to the second network connection mode. Then in a case that the first network connection mode is a cellular network connection between the first terminal and the first base station, and the second network connection mode is that the first terminal is connected to the second terminal through the non-cellular network and the second terminal is connected to the second base station through the cellular network, due to the non-cellular network connection between the first terminal and the second terminal which has been established when the second auxiliary information is transmitted, after the first terminal receives the first auxiliary information and when the network connection mode is switched, it is only necessary to disconnect the cellular network connection between the first terminal and the first base station and establish the cellular network connection between the second terminal and the second base station.

Optionally, in a case that the first network connection mode is that the first terminal is connected to the second terminal through the non-cellular network and the second terminal is connected to the cellular network, the step of receiving the second auxiliary information for switching from the first network connection mode to the second network connection mode to the second terminal includes one of:

receiving the second auxiliary information transmitted by the second terminal through the non-cellular network between the first terminal and the second terminal;

receiving the second auxiliary information configured by the network side (that is, the second base station) for the first terminal; or receiving the second auxiliary information forwarded by the network side (that is, the second base station) for the second terminal.

That is, in a case that the connection between the first terminal and the second base station through the second terminal to the cellular network direct connection between the first terminal and the first base station, the second terminal may transmit the second auxiliary information to the first terminal through any one of the above modes.

Optionally, the step of transmitting the first auxiliary information for switching from the first network connection mode to the second network connection mode to the second terminal includes:

transmitting the first auxiliary information to the second terminal in a case that a second preset triggering condition is detected.

Optionally, the step of receiving the second auxiliary information transmitted by the second terminal for switching from the first network connection mode to the second network connection includes:

receiving the second auxiliary information transmitted by the second terminal in a case that a second preset triggering condition is detected.

That is, the first terminal transmits the first auxiliary information to the second terminal and the second terminal transmits the second auxiliary information to the first terminal, which may be performed in a case that the second preset triggering condition is established.

Optionally, in a case that the first network connection mode is that the first terminal is connected to the cellular network, the second preset triggering condition includes at least one of:

initiating the switching of the network connection by the first terminal or the second terminal initiates;

a non-cellular network connection being established between the first terminal and the second terminal;

instructing to establish a non-cellular connection between the first terminal and the second terminal or to switch from the first network connection mode to the second network connection mode by an application layer of the first terminal or the second terminal;

receiving a third preset operation performed by a user by the first terminal or the second terminal;

the signal quality of the non-cellular network being higher than or equal to a first preset threshold;

sending a first request message for switching from the first network connection mode to the second network connection mode to the second terminal by the first terminal;

responding to the first request message by the second terminal;

receiving the second request message sent by the second terminal for switching from the first network connection mode to the second network connection mode by the first terminal; or responding to the second request message by the first terminal.

That is, before the cellular network direct connection between the first terminal and the first base station is switched to the connection between the first terminal and the second base station through the second terminal, the first terminal may transmit the first auxiliary information to the second terminal, or receive the second auxiliary information transmitted by the second terminal in a case that at least one of the conditions is established.

For the above second item "a non-cellular network connection is established between the first terminal and the second terminal", it may be that the first terminal is automatically connected to the second terminal through a non-cellular technology, or may be that the second terminal is automatically connected to the first terminal through the non-cellular technology; and it may be that a user operates the first terminal to perform non-cellular network connection on the first terminal and the second terminal, or may be that a user operates the second terminal to perform non-cellular network connection on the second terminal and the first terminal.

For the above fifth item, "the quality of the non-cellular network signal" may be detected by the first terminal, or may be detected by the second terminal.

Optionally, in a case that the first network connection mode is that the first terminal is connected to the second terminal through the non-cellular network and the second terminal is connected to the cellular network, the second preset triggering condition includes at least one of:

initiating the switching of the network connection by the first terminal or the second terminal;

the first terminal being connected to the cellular network;

instructing to establish a connection between the first terminal and the cellular network or to switch from the first network connection mode to the second network connection mode by an application layer of the first terminal or the second terminal;

receiving a fourth preset operation performed by a user by the first terminal or the second terminal;

the signal quality of the non-cellular network being lower than or equal to a first preset threshold;

sending a second request message for switching from the first network connection mode to the second network connection mode to the second terminal by the first terminal;

responding to the second request message by the second terminal;

receiving the second request message sent by the second terminal for switching from the first network connection mode to the second network connection mode by the first terminal; or responding to the second request message by the first terminal.

That is, before the connection between the first terminal and the second base station through the second terminal to the cellular network direct connection between the first terminal and the first base station, the first terminal may transmit the first auxiliary information to the second terminal, receive the second auxiliary information transmitted by the second terminal in a case that at least one of the conditions is established.

For the above fifth item, “the quality of the non-cellular network signal” may be detected by the first terminal, or may be detected by the second terminal.

Optionally, the first terminal and the second terminal have a binding relationship. In this way, through the technical solution of this embodiment, a plurality of terminals with a binding relationship may be paged at the same time. The terminals having a binding relationship means that the terminal IDs have a binding relationship, or the SIM or eSIM or USIM of the terminal or the corresponding number has a binding relationship. This binding relationship may be obtained through the base station from the core network entity, or through the terminal reporting.

It should be noted that the above network switching method is the description of the process of switching between two connection modes, for example, the first terminal is connected to the first base station through the cellular network and the first terminal is connected to the second base station through the second terminal, centered on the first terminal. It may be understood that in a case of taking the second terminal as a center, the process of switching between two connection modes, for example, the second terminal is connected to the second base station through the cellular network and the second terminal is connected to the first base station through the first terminal, is as same as the above process. Only in the network switching process centered on the first terminal, the network connection status of the second terminal is different from the network connection status of the second terminal in the network switching process centered on the second terminal.

Figure 2:
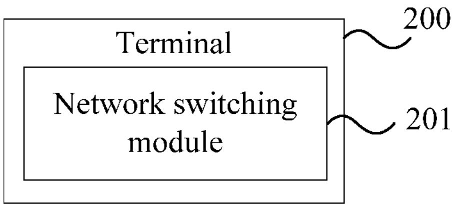
FIG. 2 shows a schematic diagram of modules of a terminal according to an embodiment of the present disclosure.

As shown in FIG. 2, an embodiment of the present disclosure provides a terminal 200. The terminal is a first terminal, and the terminal includes:

a network switching module 201, configured to, in a case that a first terminal is in a state of a first network connection mode and a first preset triggering condition is detected, switch from the first network connection mode to a second network connection mode, wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network.

Optionally, in a case that the first network connection mode is that the first terminal is connected to the cellular network, the first preset triggering condition includes at least one of:

a non-cellular network connection being established between the first terminal and the second terminal;

preset indication information being generated by an upper layer of the first terminal or the second terminal, where the preset indication information is used to indicate to switch to the second network connection mode;

the signal quality of the non-cellular network being higher than or equal to a first preset threshold;

a distance between the first terminal and the second terminal being less than or equal to a second preset threshold; or a first service of the first terminal being interrupted.

Optionally, in a case that the first network connection mode is that the first terminal is connected to the second terminal through the non-cellular network and the second terminal is connected to the cellular network, the first preset triggering condition includes at least one of:

a non-cellular network connection between the first terminal and the second terminal being disconnected;

preset indication information being generated by an upper layer of the first terminal or the second terminal, where the preset indication information is used to indicate to switch to the second network connection mode;

the signal quality of the non-cellular network being lower than or equal to a first preset threshold;

a distance between the first terminal and the second terminal being greater or equal to a second preset threshold; or a first service of the first terminal being interrupted.

Optionally, the terminal includes:

a transmitting module, configured to transmit first auxiliary information for switching from the first network connection mode to the second network connection mode to the second terminal.

Optionally, in a case that the first network connection mode is that the first terminal is connected to the cellular network, the first auxiliary information includes at least one of:

identification information of the first terminal;

identification information of a subscriber identity module corresponding to the first terminal, identification information of an embedded subscriber identity module corresponding to the first terminal, or identification information of a universal subscriber identity module corresponding to the first terminal;

a frequency point at which the first terminal accesses the cellular network;

a radio access technology for the first terminal to access the cellular network;

a cell identifier for the first terminal to access the cellular network;

a public land mobile network identifier for the first terminal to access the cellular network;

a reference signal measurement value corresponding to the cellular network measured by the first terminal or measurement related configuration;

at least part of capability information of the first terminal;

related configuration information configured by a network side for the first terminal to monitor a physical downlink control channel;

at least part of random access channel configuration for the first terminal to access the cellular network;

at least part of system messages of a cell which the first terminal is currently connected to;

at least part of radio resource control configuration information corresponding to the first terminal in the cellular network;

hybrid automatic retransmission request process related information of the first terminal in a connection state;

a counter or timer related to a radio resource control layer of the first terminal;

a counter or timer related to a radio link control layer of the first terminal;

a counter or timer related to a packet data convergence protocol layer of the first terminal;

a counter or timer related to a service data adaption protocol layer of the first terminal;

a counter or timer related to a media access control layer of the first terminal;

discontinuous reception configuration information of the first terminal;

packet data convergence protocol configuration information of the first terminal;

Internet protocol layer configuration information of the first terminal; or geographic location information of the first terminal.

Optionally, in a case that the first network connection mode is that the first terminal is connected to the second terminal through the non-cellular network and the second terminal is connected to the cellular network, the first auxiliary information includes at least one of:

identification information of the first terminal;

identification information of a subscriber identity module corresponding to the first terminal, identification information of an embedded subscriber identity module corresponding to the first terminal, or identification information of a universal subscriber identity module corresponding to the first terminal;

a reference signal measurement value corresponding to the cellular network measured by the first terminal or measurement related configuration;

at least part of capability information of the first terminal;

at least part of system messages of a network side;

Internet protocol layer configuration information of the first terminal;

configuration information which the first terminal needs to request from the network side; or geographic location information of the first terminal.

Optionally, in a case that the first network connection mode is that the first terminal is connected to the cellular network, the transmitting module is configured to perform one of:

configuring the first auxiliary information for the second terminal through the network side; and forwarding the first auxiliary information to the second terminal through the network side; or establishing a non-cellular network connection between the first terminal and the second terminal, and transmitting the first auxiliary information to the second terminal through the non-cellular network connection between the first terminal and the second terminal.

Optionally, in a case that the first network connection mode is that the first terminal is connected to the second terminal through the non-cellular network and the second terminal is connected to the cellular network, the transmitting module is configured to perform one of:

transmitting the first auxiliary information to the second terminal through the non-cellular network between the first terminal and the second terminal;

configuring the first auxiliary information for the second terminal through the network side; or forwarding the first auxiliary information to the second terminal through the network side.

Optionally, the transmitting module is configured to:

transmit the first auxiliary information to the second terminal in a case that a second preset triggering condition is detected.

Optionally, the terminal also includes:

a receiving module, configured to receive second auxiliary information transmitted by the second terminal for switching from the first network connection mode to the second network connection mode.

Optionally, in a case that the first network connection mode is that the first terminal is connected to the cellular network, the second auxiliary information includes at least one of:

identification information of the second terminal;

identification information of a subscriber identity module corresponding to the second terminal, identification information of an embedded subscriber identity module corresponding to the first terminal, or identification information of a universal subscriber identity module corresponding to the first terminal;

at least part of capability information of the second terminal;

Internet protocol layer configuration information of the second terminal; or geographic location information of the second terminal.

Optionally, in a case that the first network connection mode is that the first terminal is connected to the second terminal through the non-cellular network and the second terminal is connected to the cellular network, the second auxiliary information includes at least one of:

identification information of the second terminal;

identification information of a subscriber identity module corresponding to the second terminal, identification information of an embedded subscriber identity module corresponding to the first terminal, or identification information of a universal subscriber identity module corresponding to the first terminal;

a frequency point at which the second terminal accesses the cellular network;

a radio access technology for the second terminal to access the cellular network;

a cell identifier for the second terminal to access the cellular network;

a public land mobile network identifier for the second terminal to access the cellular network;

a reference signal measurement value corresponding to the cellular network measured by the first terminal or measurement related configuration; at least part of capability information of the second terminal;

related configuration information configured by a network side device for the second terminal to monitor a physical downlink control channel;

at least part of random access channel configuration for the second terminal to access the cellular network;

at least part of system messages of a cell which the second terminal is currently connected to;

at least part of radio resource control configuration information corresponding to the second terminal in the cellular network;

hybrid automatic retransmission request process related information of the second terminal in a connection state;

a counter or timer related to a radio resource control layer of the second terminal;

a counter or timer related to a radio link control layer of the second terminal;

a counter or timer related to a packet data convergence protocol layer of the second terminal;

a counter or timer related to a service data adaption protocol layer of the second terminal;

a counter or timer related to a media access control layer of the second terminal;

discontinuous reception configuration information of the second terminal;

packet data convergence protocol configuration information of the second terminal;

Internet protocol layer configuration information of the second terminal; or geographic location information of the second terminal.

Optionally, in a case that the first network connection mode is that the first terminal is connected to the cellular network, the receiving module is configured to perform one of:

receiving the second auxiliary information configured by the network side for the first terminal;

receiving the second auxiliary information forwarded by the network side for the second terminal; or establishing a non-cellular network connection between the first terminal and the second terminal, and receiving the second auxiliary information transmitted by the second terminal through the non-cellular network connection between the first terminal and the second terminal.

Optionally, in a case that the first network connection mode is that the first terminal is connected to the second terminal through the non-cellular network and the second terminal is connected to the cellular network, the receiving module is configured to perform one of:

receiving the second auxiliary information transmitted by the second terminal through the non-cellular network between the first terminal and the second terminal;

receiving the second auxiliary information configured by the network side for the first terminal; or receiving the second auxiliary information forwarded by the network side for the second terminal.

Optionally, the receiving module is configured to:

receive the second auxiliary information transmitted by the second terminal when a second preset triggering condition is detected.

Optionally, in a case that the first network connection mode is that the first terminal is connected to the cellular network, the second preset triggering condition includes at least one of:

initiating the switching of the network connection by the first terminal or the second terminal;

a non-cellular network connection being established between the first terminal and the second terminal;

instructing to establish a non-cellular connection between the first terminal and the second terminal or to switch from the first network connection mode to the second network connection mode by an application layer of the first terminal or the second terminal;

receiving a third preset operation performed by a user by the first terminal or the second terminal;

the signal quality of the non-cellular network being higher than or equal to a first preset threshold;

sending a first request message for switching from the first network connection mode to the second network connection mode to the second terminal by the first terminal;

responding to the first request message by the second terminal;

receiving the second request message sent by the second terminal for switching from the first network connection mode to the second network connection mode by the first terminal; or responding to the second request message by the first terminal.

Optionally, in a case that the first network connection mode is that the first terminal is connected to the second terminal through the non-cellular network and the second terminal is connected to the cellular network, the second preset triggering condition includes at least one of:

initiating the switching of the network connection by the first terminal or the second terminal;

the first terminal being connected to the cellular network;

instructing to establish a connection between the first terminal and the cellular network or to switch from the first network connection mode to the second network connection mode by an application layer of the first terminal or the second terminal;

receiving a fourth preset operation performed by a user by the first terminal or the second terminal;

the signal quality of the non-cellular network being lower than or equal to a first preset threshold;

sending a second request message for switching from the first network connection mode to the second network connection mode to the second terminal by the first terminal;

responding to the second request message by the second terminal;

receiving the second request message sent by the second terminal for switching from the first network connection mode to the second network connection mode by the first terminal; or responding to the second request message by the first terminal.

It should be noted that the terminal embodiment is a terminal corresponding to the above network switching method applied to the first terminal, all the implementation manners of the above embodiments are all suitable for this terminal embodiment, and the same technical effect can be achieved.

Figure 3:
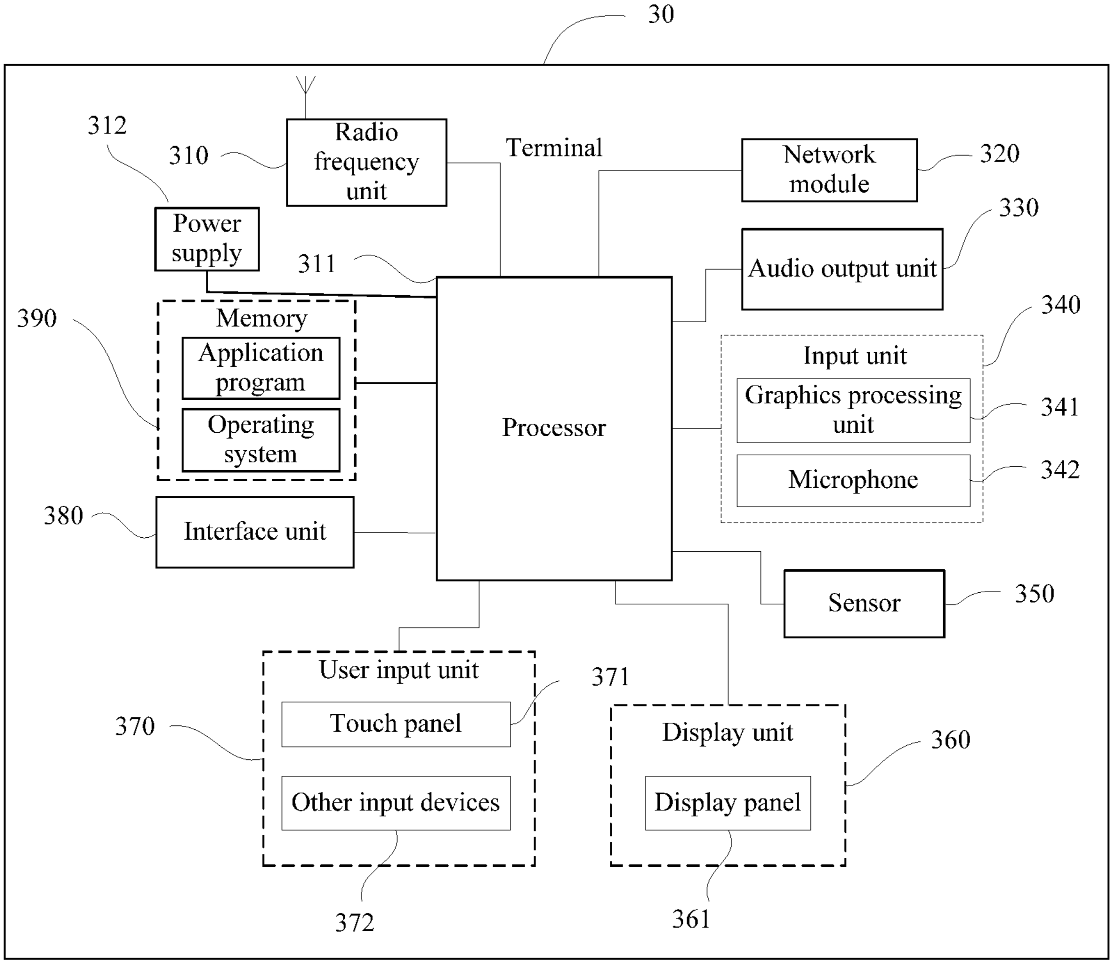
FIG. 3 shows a structural block diagram of a terminal according to an embodiment of the present disclosure.

FIG. 3 is a schematic diagram of a hardware structure of a terminal according to an embodiment of the present disclosure.

The terminal 30 is the first terminal. The terminal 30 includes but is not limited to: a radio frequency unit 310, a network module 320, an audio output unit 330, an input unit 340, a sensor 350, a display unit 360, a user input unit 370, an interface unit 380, a memory 390, a processor 311, a power supply 312, and the like. Those skilled in the art may understand that the terminal structure shown in FIG. 3 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a laptop computer, a palmtop computer, a vehicle-mounted terminal, a wearable device, a pedometer, and the like.

The processor 310 is configured to, in a case that a first terminal is in a state of a first network connection mode and a first preset triggering condition is detected, switch from the first network connection mode to a second network connection mode, wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network.

It should be understood that, in this embodiment of the present disclosure, the radio frequency unit 310 may be configured to receive and transmit signals in the process of sending and receiving messages or talking. For example, after the downlink data from the network side device is received, it is processed by the processor 311; in addition, the uplink data is transmitted to the network side device. Generally, the radio frequency unit 310 includes, but is not limited to, an antenna, at least one amplifier, a transceiver, a coupler, a low noise amplifier, and a duplexer, and the like. In addition, the radio frequency unit 310 may also communicate with a network and another device via a wireless communications system.

The terminal provides a user with wireless broadband Internet access by using the network module 320, for example, helping the user send and receive emails, browse web pages, and access streaming media.

The audio output unit 330 may convert audio data received by the radio frequency unit 310 or the network module 320 or stored in the memory 390 into an audio signal and output the audio signal as a sound. Moreover, the audio output unit 330 may further provide an audio output (for example, a call signal received voice, or a message received voice) related to a specific function executed by the terminal 30. The audio output unit 330 includes a loudspeaker, a buzzer, a receiver, and the like.

The input unit 340 is configured to receive an acoustic signal or a video signal. The input unit 340 may include a graphics processing unit (GPU) 341 and a microphone 342. The graphics processing unit 341 processes image data of a static picture or a video obtained by an image capturing apparatus (for example, a camera) in a video capturing mode or an image capturing mode. A processed image frame may be displayed on the display unit 360. The image frame processed by the graphics processing unit 341 may be stored in the memory 390 (or another storage medium) or transmitted via the radio frequency unit 310 or the network module 320. The microphone 342 may receive a sound and can process such sound into audio data. The processed audio data may be output by being converted into a format that may be sent to a mobile communications network side device by using the radio frequency unit 310 in a telephone call mode.

The terminal 30 further includes at least one sensor 350, such as a light sensor, a motion sensor and other sensors. For example, the light sensor includes an ambient light sensor and a proximity sensor, wherein the ambient light sensor may adjust brightness of a display panel 361 based on brightness of ambient light, and the proximity sensor may turn off the display panel 361 and/or backlight when the terminal 30 is moved towards the ear. As a type of motion sensor, an accelerometer sensor may detect acceleration values in directions (that are generally three axes), and detect a value and a direction of gravity when the accelerometer sensor is static, and may be configured to: recognize terminal posture (for example, screen switching between landscape and portrait modes, a related game, or magnetometer posture calibration), and perform a function related to vibration recognition (for example, a pedometer or a knock), and the like. The sensor 350 may further include a fingerprint sensor, a pressure sensor, an iris sensor, a molecular sensor, a gyroscope, a barometer, a hygrometer, a thermometer, an infrared sensor, and the like. Details are not described herein again.

The display unit 360 is configured to display information entered by a user or information provided for the user. The display unit 360 may include the display panel 361, and the display panel 361 may be configured in a form of a liquid crystal display (LCD), an organic light-emitting diode (OLED), or the like.

A user input unit 370 may be configured to receive input digital or character information, and generate key signal input related to user setting and function control of a terminal. For example, the user input unit 370 includes a touch panel 371 and another input device 372. The touch panel 371, also called a touch screen, may collect touch operation on or near the touch panel by users (for example, operation on the touch panel 371 or near the touch panel 371 by fingers or any suitable objects or accessories such as a touch pen by the users). The touch panel 371 may include two parts: a touch detection device and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 311, and receives and executes a command sent by the processor 311. In addition, the touch panel 371 may be implemented by using a plurality of types such as a resistive type, a capacitive type, an infrared ray type, and a surface acoustic wave type. In addition to the touch panel 371, the user input unit 370 may further include other input devices 372. For example, the other input devices 372 may include but are not limited to: a physical keyboard, a function key (such as a volume control key, a switch key), a trackball, a mouse, and a joystick, which is no longer repeated here.

Optionally, the touch panel 371 may cover the display panel 361. After detecting the touch operation on or near the touch panel 371, the touch panel 371 transmits the touch operation to the processor 311 to determine a type of a touch event, and then the processor 311 provides corresponding visual output on the display panel 361 based on the type of the touch event. In FIG. 3, the touch panel 371 and the display panel 361 are used as two independent components to implement input and output functions of the terminal. However, in some embodiments, the touch panel 371 and the display panel 361 may be integrated to implement the input and output functions of the terminal. This is not limited herein.

The interface unit 380 is an interface connecting an external device to the terminal 30. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 380 may be configured to receive input (for example, data information and power) from the external apparatus and transmit the received input to one or more elements in the terminal 30, or may be configured to transmit data between the terminal 30 and the external apparatus.

The memory 390 may be configured to store a software program and various data. The memory 390 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 330 may include a high-speed random access memory, or may include a non-volatile memory, for example, at least one disk storage device, a flash memory, or another volatile solid-state storage device.

The processor 311 is a control center of the terminal, and connects all parts of the entire terminal through various interfaces and lines. By running or executing a software program and/or a module stored in the memory 390 and invoking data stored in the memory 390, the processor 311 performs various functions of the terminal and data processing, to perform overall monitoring on the terminal. The processor 311 may include one or more processing units. Optionally, the processor 311 may be integrated with an application processor and a modem processor. The application processor mainly processes the operating system, the user interface, applications, etc. The modem processor mainly processes wireless communication. It may be understood that the modem processor may not be integrated into the processor 311.

The terminal 30 may further include a power supply 312 (for example, a battery) that supplies power to various components. Optionally, the power supply 312 may be logically connected to the processor 311 through a power supply management system, to perform functions of managing charging, discharging, and power consumption through the power supply management system.

In addition, the terminal 30 includes some function modules that are not shown, which are not elaborated here.

Optionally, the embodiments of the present disclosure further provide a terminal, including a processor 311, a memory 390, and a computer program stored in the memory 390 and executable on the processor 311, wherein when the computer program is executed by the processor 311, various process of the network switching method embodiment are implemented, and the same technical effect can be achieved. To avoid repetition, details are not described herein again.

The embodiments of the present disclosure further provide a non-transitory computer-readable storage medium. The non-transitory computer-readable storage medium stores a computer program. When the computer program is executed by a processor, the processes of the foregoing network switching method embodiment are implemented, and the same technical effect can be achieved. To avoid repetition, details are not described herein again. The non-transitory computer-readable storage medium includes a read-only memory (ROM), a random access memory (RAM), a magnetic disk, an optical disc, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the methods described in the embodiments of the present disclosure.

The optional implementations of the present disclosure are described above. It should be noted that a person of ordinary skill in the art may further make some improvements and refinements without departing from the principles described in the present disclosure and these improvements and refinements shall also fall within the protection scope of the present disclosure.

What is claimed is:

1. A network switching method, performed by a first terminal and comprising:

determining that the first terminal is in a state of a first network connection mode and a first preset triggering condition is detected;

in response to the determining the first terminal is in a state of a first network connection mode and a first preset triggering condition is detected, switching from the first network connection mode to a second network connection mode;

wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network;

when the first network connection mode is that the first terminal is connected to the cellular network, the first preset triggering condition comprises:

a non-cellular network connection being established between the first terminal and the second terminal; or when the first network connection mode is that the first terminal is connected to the second terminal through the non-cellular network and the second terminal is connected to the cellular network, the first preset triggering condition comprises:

a non-cellular network connection between the first terminal and the second terminal being disconnected;

before the switching from the first network connection mode to a second network connection mode, the method further comprises:

transmitting first auxiliary information for switching from the first network connection mode to the second network connection mode to the second terminal;

the transmitting first auxiliary information for switching from the first network connection mode to the second network connection mode to the second terminal comprises:

determining whether the first network connection mode is that the first terminal is connected to the cellular network or the first terminal is connected to the second terminal through the non-cellular network and the second terminal is connected to the cellular network;

in response to the determining the first network connection mode is that the first terminal is connected to the cellular network, establishing a non-cellular network connection between the first terminal and the second terminal, and transmitting the first auxiliary information to the second terminal through the non-cellular network connection between the first terminal and the second terminal;

in response to the determining the first network connection mode is that the first terminal is connected to the second terminal through the non-cellular network and the second terminal is connected to the cellular network, transmitting the first auxiliary information to the second terminal through the non-cellular network between the first terminal and the second terminal;

in response to the determining the first network connection mode is that the first terminal is connected to the cellular network, the first auxiliary information comprises hybrid automatic retransmission request (HARQ) process related information of the first terminal in a connection state, wherein the HARQ process related information comprises an HARQ process number;

in response to the determining the first network connection mode is that the first terminal is connected to the second terminal through the non-cellular network and the second terminal is connected to the cellular network, the first auxiliary information comprises at least part of system messages of a network side.

2. The network switching method according to claim 1, wherein when the first network connection mode is that the first terminal is connected to the cellular network, the first auxiliary information further comprises at least one of:

identification information of the first terminal;

identification information of a subscriber identity module corresponding to the first terminal, identification information of an embedded subscriber identity module corresponding to the first terminal, or identification information of a universal subscriber identity module corresponding to the first terminal;

a frequency point at which the first terminal accesses the cellular network;

a radio access technology for the first terminal to access the cellular network;

a cell identifier for the first terminal to access the cellular network;

a public land mobile network identifier for the first terminal to access the cellular network;

a reference signal measurement value corresponding to the cellular network measured by the first terminal or measurement related configuration;

at least part of capability information of the first terminal;

related configuration information configured by a network side for the first terminal to monitor a physical downlink control channel;

at least part of random access channel configuration for the first terminal to access the cellular network;

at least part of system messages of a cell which the first terminal is currently connected to;

at least part of radio resource control configuration information corresponding to the first terminal in the cellular network;

a counter or timer related to a radio resource control layer of the first terminal;

a counter or timer related to a radio link control layer of the first terminal;

a counter or timer related to a packet data convergence protocol layer of the first terminal;

a counter or timer related to a service data adaption protocol layer of the first terminal;

a counter or timer related to a media access control layer of the first terminal;

discontinuous reception configuration information of the first terminal;

packet data convergence protocol configuration information of the first terminal;

Internet protocol layer configuration information of the first terminal; or geographic location information of the first terminal.

3. The network switching method according to claim 1, wherein when the first network connection mode is that the first terminal is connected to the second terminal through the non-cellular network and the second terminal is connected to the cellular network, the first auxiliary information further comprises at least one of:

identification information of the first terminal;

identification information of a subscriber identity module corresponding to the first terminal, identification information of an embedded subscriber identity module corresponding to the first terminal, or identification information of a universal subscriber identity module corresponding to the first terminal;

a reference signal measurement value corresponding to the cellular network measured by the first terminal or measurement related configuration;

at least part of capability information of the first terminal;

Internet protocol layer configuration information of the first terminal;

configuration information which the first terminal needs to request from the network side; or geographic location information of the first terminal.

4. The network switching method according to claim 1, wherein the transmitting first auxiliary information for switching from the first network connection mode to the second network connection mode to the second terminal further comprises:

transmitting the first auxiliary information to the second terminal when a second preset triggering condition is detected.

5. The network switching method according to claim 1, wherein before the switching from the first network connection mode to a second network connection mode, the method further comprises:

receiving second auxiliary information transmitted by the second terminal for switching from the first network connection mode to the second network connection mode;

wherein the receiving second auxiliary information transmitted by the second terminal for switching from the first network connection mode to the second network connection mode comprises:

when the first network connection mode is that the first terminal is connected to the cellular network, establishing a non-cellular network connection between the first terminal and the second terminal, and receiving the second auxiliary information transmitted by the second terminal through the non-cellular network connection between the first terminal and the second terminal;

when the first network connection mode is that the first terminal is connected to the second terminal through the non-cellular network and the second terminal is connected to the cellular network, receiving the second auxiliary information transmitted by the second terminal through the non-cellular network between the first terminal and the second terminal.

6. The network switching method according to claim 5, wherein when the first network connection mode is that the first terminal is connected to the cellular network, the second auxiliary information comprises at least one of:

identification information of the second terminal;

identification information of a subscriber identity module corresponding to the second terminal, identification information of an embedded subscriber identity module corresponding to the first terminal, or identification information of a universal subscriber identity module corresponding to the first terminal;

at least part of capability information of the second terminal;

Internet protocol layer configuration information of the second terminal; or geographic location information of the second terminal.

7. The network switching method according to claim 5, wherein when the first network connection mode is that the first terminal is connected to the second terminal through the non-cellular network and the second terminal is connected to the cellular network, the second auxiliary information comprises at least one of:

identification information of the second terminal;

identification information of a subscriber identity module corresponding to the second terminal, identification information of an embedded subscriber identity module corresponding to the first terminal, or identification information of a universal subscriber identity module corresponding to the first terminal;

a frequency point at which the second terminal accesses the cellular network;

a radio access technology for the second terminal to access the cellular network;

a cell identifier for the second terminal to access the cellular network;

a public land mobile network identifier for the second terminal to access the cellular network;

a reference signal measurement value corresponding to the cellular network measured by the second terminal or measurement related configuration;

at least part of capability information of the second terminal;

related configuration information configured by a network side for the second terminal to monitor a physical downlink control channel;

at least part of random access channel configuration for the second terminal to access the cellular network;

at least part of system messages of a cell which the second terminal is currently connected to;

at least part of radio resource control configuration information corresponding to the second terminal in the cellular network;

hybrid automatic retransmission request process related information of the second terminal in a connection state;

a counter or timer related to a radio resource control layer of the second terminal;

a counter or timer related to a radio link control layer of the second terminal;

a counter or timer related to a packet data convergence protocol layer of the second terminal;

a counter or timer related to a service data adaption protocol layer of the second terminal;

a counter or timer related to a media access control layer of the second terminal;

discontinuous reception configuration information of the second terminal;

packet data convergence protocol configuration information of the second terminal;

Internet protocol layer configuration information of the second terminal; or geographic location information of the second terminal.

8. The network switching method according to claim 1, wherein before the switching from the first network connection mode to a second network connection mode, the method further comprises:

receiving second auxiliary information transmitted by the second terminal for switching from the first network connection mode to the second network connection mode;

when the first network connection mode is that the first terminal is connected to the cellular network, the receiving second auxiliary information transmitted by the second terminal for switching from the first network connection mode to the second network connection mode comprises one of:

receiving the second auxiliary information configured by a network side for the first terminal; or receiving the second auxiliary information forwarded by a network side for the second terminal.

9. The network switching method according to claim 1, wherein before the switching from the first network connection mode to a second network connection mode, the method further comprises:

receiving second auxiliary information transmitted by the second terminal for switching from the first network connection mode to the second network connection mode;

when the first network connection mode is that the first terminal is connected to the second terminal through the non-cellular network and the second terminal is connected to the cellular network, the receiving second auxiliary information transmitted by the second terminal for switching from the first network connection mode to the second network connection mode comprises one of:

receiving the second auxiliary information configured by a network side for the first terminal; or receiving the second auxiliary information forwarded by a network side for the second terminal.

10. The network switching method according to claim 5, wherein the receiving second auxiliary information transmitted by the second terminal for switching from the first network connection mode to the second network connection mode comprises:

receiving the second auxiliary information transmitted by the second terminal when a second preset triggering condition is detected.

11. The network switching method according to claim 4, wherein when the first network connection mode is that the first terminal is connected to the cellular network, the second preset triggering condition comprises at least one of:

initiating a switching of a network connection by the first terminal or the second terminal;

a non-cellular network connection being established between the first terminal and the second terminal;

instructing to establish a non-cellular connection between the first terminal and the second terminal or to switch from the first network connection mode to the second network connection mode by an application layer of the first terminal or the second terminal;

receiving a third preset operation performed by a user by the first terminal or the second terminal;

signal quality of the non-cellular network being higher than or equal to a first preset threshold;

sending a first request message for switching from the first network connection mode to the second network connection mode to the second terminal by the first terminal;

responding to the first request message by the second terminal;

receiving a second request message sent by the second terminal for switching from the first network connection mode to the second network connection mode by the first terminal; or responding to the second request message by the first terminal; and/or when the first network connection mode is that the first terminal is connected to the second terminal through the non-cellular network and the second terminal is connected to the cellular network, the second preset triggering condition comprises at least one of following:

initiating a switching of a network connection by the first terminal or the second terminal;

the first terminal being connected to the cellular network;

instructing to establish a connection between the first terminal and the cellular network or to switch from the first network connection mode to the second network connection mode by an application layer of the first terminal or the second terminal;

receiving a fourth preset operation performed by a user by the first terminal or the second terminal;

signal quality of the non-cellular network being lower than or equal to a first preset threshold;

sending a second request message for switching from the first network connection mode to the second network connection mode to the second terminal by the first terminal;

responding to the second request message by the second terminal;

receiving the second request message sent by the second terminal for switching from the first network connection mode to the second network connection mode by the first terminal; or responding to the second request message by the first terminal.

12. A terminal, wherein the terminal is a first terminal, and the first terminal comprises a memory, a processor, and a computer program stored in the memory and executable on the processor; the computer program, when executed by the processor, causes the first terminal to perform:

when the first terminal is in a state of a first network connection mode and a first preset triggering condition is detected, switching from the first network connection mode to a second network connection mode;

wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network;

wherein when the first network connection mode is that the first terminal is connected to the cellular network, the first preset triggering condition comprises:

a non-cellular network connection being established between the first terminal and the second terminal; or when the first network connection mode is that the first terminal is connected to the second terminal through the non-cellular network and the second terminal is connected to the cellular network, the first preset triggering condition comprises:

a non-cellular network connection between the first terminal and the second terminal being disconnected;

before the switching from the first network connection mode to a second network connection mode, the computer program, when executed by the processor, further causes the first terminal to perform:

transmitting first auxiliary information for switching from the first network connection mode to the second network connection mode to the second terminal;

the transmitting first auxiliary information for switching from the first network connection mode to the second network connection mode to the second terminal comprises:

when the first network connection mode is that the first terminal is connected to the cellular network, establishing a non-cellular network connection between the first terminal and the second terminal, and transmitting the first auxiliary information to the second terminal through the non-cellular network connection between the first terminal and the second terminal;

when the first network connection mode is that the first terminal is connected to the second terminal through the non-cellular network and the second terminal is connected to the cellular network, transmitting the first auxiliary information to the second terminal through the non-cellular network between the first terminal and the second terminal;

wherein when the first network connection mode is that the first terminal is connected to the cellular network, the first auxiliary information comprises hybrid automatic retransmission request (HARQ) process related information of the first terminal in a connection state, wherein the HARQ process related information comprises an HARQ process number;

wherein when the first network connection mode is that the first terminal is connected to the second terminal through the non-cellular network and the second terminal is connected to the cellular network, the first auxiliary information comprises at least part of system messages of a network side.

13. A non-transitory computer readable storage medium, wherein the non-transitory computer-readable storage medium stores a computer program, and the computer program, when executed by a processor of a first terminal, causes the first terminal to perform:

when the first terminal is in a state of a first network connection mode and a first preset triggering condition is detected, switching from the first network connection mode to a second network connection mode;

wherein one of the first network connection mode and the second network connection mode is that the first terminal is connected to a cellular network, and another of the first network connection mode and the second network connection mode is that the first terminal is connected to a second terminal through a non-cellular network and the second terminal is connected to the cellular network;

wherein when the first network connection mode is that the first terminal is connected to the cellular network, the first preset triggering condition comprises:

a non-cellular network connection being established between the first terminal and the second terminal; or when the first network connection mode is that the first terminal is connected to the second terminal through the non-cellular network and the second terminal is connected to the cellular network, the first preset triggering condition comprises:

a non-cellular network connection between the first terminal and the second terminal being disconnected;

before the switching from the first network connection mode to a second network connection mode, the computer program, when executed by the processor, further causes the first terminal to perform:

transmitting first auxiliary information for switching from the first network connection mode to the second network connection mode to the second terminal;

the transmitting first auxiliary information for switching from the first network connection mode to the second network connection mode to the second terminal comprises:

when the first network connection mode is that the first terminal is connected to the cellular network, establishing a non-cellular network connection between the first terminal and the second terminal, and transmitting the first auxiliary information to the second terminal through the non-cellular network connection between the first terminal and the second terminal;

when the first network connection mode is that the first terminal is connected to the second terminal through the non-cellular network and the second terminal is connected to the cellular network, transmitting the first auxiliary information to the second terminal through the non-cellular network between the first terminal and the second terminal;

when the first network connection mode is that the first terminal is connected to the cellular network, the first auxiliary information comprises hybrid automatic retransmission request (HARQ) process related information of the first terminal in a connection state, wherein the HARQ process related information comprises an HARQ process number;

when the first network connection mode is that the first terminal is connected to the second terminal through the non-cellular network and the second terminal is connected to the cellular network, the first auxiliary information comprises at least part of system messages of a network side.

14. The terminal according to claim 12, wherein before the switching from the first network connection mode to a second network connection mode, the computer program, when executed by the processor, causes the first terminal to further perform:

receiving second auxiliary information transmitted by the second terminal for switching from the first network connection mode to the second network connection mode;

wherein the receiving second auxiliary information transmitted by the second terminal for switching from the first network connection mode to the second network connection mode comprises:

when the first network connection mode is that the first terminal is connected to the cellular network, establishing a non-cellular network connection between the first terminal and the second terminal, and receiving the second auxiliary information transmitted by the second terminal through the non-cellular network connection between the first terminal and the second terminal;

when the first network connection mode is that the first terminal is connected to the second terminal through the non-cellular network and the second terminal is connected to the cellular network, receiving the second auxiliary information transmitted by the second terminal through the non-cellular network between the first terminal and the second terminal.

15. The non-transitory computer readable storage medium according to claim 13, wherein before the switching from the first network connection mode to a second network connection mode, the computer program, when executed by the processor, causes the first terminal to further perform:

receiving second auxiliary information transmitted by the second terminal for switching from the first network connection mode to the second network connection mode;

wherein the receiving second auxiliary information transmitted by the second terminal for switching from the first network connection mode to the second network connection mode comprises:

when the first network connection mode is that the first terminal is connected to the cellular network, establishing a non-cellular network connection between the first terminal and the second terminal, and receiving the second auxiliary information transmitted by the second terminal through the non-cellular network connection between the first terminal and the second terminal;

when the first network connection mode is that the first terminal is connected to the second terminal through the non-cellular network and the second terminal is connected to the cellular network, receiving the second auxiliary information transmitted by the second terminal through the non-cellular network between the first terminal and the second terminal.

* * * * *